US012734944B2

(12) United States Patent
Leng et al.

(10) Patent No.: US 12,734,944 B2
(45) Date of Patent: Sep. 15, 2026

(54) VEHICLE SEAT HAVING A TUNED MASS DAMPER

(71) Applicant: Bayerische Motoren Werke Aktiengesellschaft, Munich (DE)

(72) Inventors: Michael Leng, Geltendorf (DE); Mathias Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 160 days.

(21) Appl. No.: 18/566,792

(22) PCT Filed: Jul. 26, 2022

(86) PCT No.: PCT/EP2022/070924
§ 371 (c)(1),
(2) Date: Dec. 4, 2023

(87) PCT Pub. No.: WO2023/016797
PCT Pub. Date: Feb. 16, 2023

(65) Prior Publication Data
US 2024/0367563 A1 Nov. 7, 2024

(30) Foreign Application Priority Data
Aug. 9, 2021 (DE) ..................... 10 2021 120 623.5

(51) Int. Cl.
*B60N 2/52* (2006.01)
*B60N 2/42* (2006.01)
(Continued)

(52) U.S. Cl.
CPC ............. *B60N 2/64* (2013.01); *B60N 2/4242* (2013.01); *B60N 2/522* (2013.01); *B60N 2/90* (2018.02); *F16F 7/104* (2013.01); *B60G 2202/25* (2013.01)

(58) Field of Classification Search
CPC ...... B60N 2/522; B60N 2/4242; B60N 2/503; B60N 2/501; B60G 2202/25; F16F 7/104;
(Continued)

(56) References Cited

U.S. PATENT DOCUMENTS 1,540,734 A * 6/1925 Houdry ..................... F16F 1/22 267/37.4
4,186,963 A * 2/1980 Koutsky ................ B60N 2/505 297/308
(Continued)

FOREIGN PATENT DOCUMENTS

CN 107000614 A 8/2017
CN 109578490 A * 4/2019 ............. G01B 5/061
(Continued)

OTHER PUBLICATIONS

International Search Report (PCT/ISA/210) issued in PCT Application No. PCT/EP2022/070924 dated Nov. 29, 2022 with English translation (4 pages).
(Continued)

*Primary Examiner* — Timothy J Brindley
(74) *Attorney, Agent, or Firm* — Crowell & Moring LLP

(57) ABSTRACT

A vehicle seat has a tuned mass damper, wherein the vehicle seat has a seat bottom element, which is or can be connected to a vehicle structure, and a seat back that can be tilted on the seat bottom element about a backrest tilt axis. The seat back has a tuned mass damper that is coupled to a backrest structure of the seat back and integrated into the seat back, wherein the tuned mass damper has at least one retaining element that is connected to the backrest structure of the seat back, is elastic at least in some regions and has a first coupler that can be coupled to a second coupler provided on a damper mass element, wherein the first coupler and the second coupler form a multi-stage coupling assembly, by
(Continued)

which the distance between the backrest tilt axis and the damper mass element can be varied.

5 Claims, 2 Drawing Sheets

(51) Int. Cl.
*B60N 2/64* (2006.01)
*B60N 2/90* (2018.01)
*F16F 7/104* (2006.01)

(58) Field of Classification Search
CPC .... F16F 9/44; F16F 7/108; F16F 1/121; F16F 9/0245
See application file for complete search history.

(56) References Cited

U.S. PATENT DOCUMENTS 4,238,104 A * 12/1980 Hamilton .................. F16F 3/10 188/380
5,016,409 A * 5/1991 Sato ........................ E01D 19/00 52/167.2
5,816,373 A * 10/1998 Osterberg ............ F16F 7/1017 188/380
6,681,908 B2 * 1/2004 Davis ....................... F16F 7/116 188/380
7,011,191 B2 * 3/2006 Spicer ....................... E05F 5/00 188/161
8,590,966 B2 * 11/2013 Gaines ................... B60N 2/809 297/216.12
9,981,587 B2 * 5/2018 Mizobata ................. B60N 2/80
10,252,649 B2 * 4/2019 Sasaki .................... B60N 2/544
10,384,877 B2 * 8/2019 Quinn .................... B65G 27/20
11,125,295 B2 * 9/2021 Nishizawa ............... B60N 2/90
11,180,060 B2 * 11/2021 Muck ....................... B60N 2/20
11,440,453 B2 * 9/2022 Tamhankar ............ B60N 2/879
11,753,819 B2 * 9/2023 Swallow ................. F16F 7/026 188/380
2005/0011713 A1 * 1/2005 Yasumoto ............... F16F 7/108 188/373
2006/0175169 A1 * 8/2006 Or ........................... F16F 7/104 188/379
2008/0211151 A1 9/2008 Wieser et al.
2010/0032256 A1 * 2/2010 Wieser .................... F16F 7/108 188/380
2014/0048989 A1 * 2/2014 Platus ..................... F16F 15/04 267/140.5
2017/0320407 A1 11/2017 Koike
2019/0271370 A1 * 9/2019 Nishizawa ............... B60N 2/64
2020/0271182 A1 * 8/2020 Hugenschmidt ...... F16F 1/3735
2024/0190310 A1 * 6/2024 Baumert ................. F16F 7/108

FOREIGN PATENT DOCUMENTS

DE 103 27 770 A1 1/2005
DE 10 2005 019 323 A1 7/2006
DE 20 2008 004 078 U1 8/2008
DE 102014206232 A1 * 10/2015 .............. F16F 7/108
DE 10 2016 112 543 A1 1/2017
EP 2634041 A1 * 9/2013 ............. B60N 2/503
JP 2-57476 A 2/1990
JP 2012-184826 A 9/2012
JP 2013-24392 A 2/2013
KR 102585126 B1 * 10/2023 ............. B60G 11/58
WO WO 2016-189730 A1 12/2016

OTHER PUBLICATIONS

German-language Written Opinion (PCT/ISA/237) issued in PCT Application No. PCT/EP2022/070924 dated Nov. 29, 2022 with English translation (7 pages).
German Search Report issued in German Application No. 10 2021 120 623.5 dated Mar. 14, 2022 with partial English translation (10 pages).
English-language Office Action issued in Chinese Application No. 202280035196.0 dated Jan. 30, 2026 (7 pages).

* cited by examiner 11
13
13'
14'
14
II
1
15
2
14''
12
L
10
17
19
18
4
40
$Y_1$
42
F
z
x
y

VEHICLE SEAT HAVING A TUNED MASS DAMPER

BACKGROUND AND SUMMARY

The invention relates to a vehicle seat having a vibration absorber. It furthermore relates to a vehicle, in particular a motor vehicle, having at least one such vehicle seat.

Particularly in the case of vehicle seats having an increased mass in the backrest, for example caused by integrating a seat belt in the backrest or by integrating other equipment used for comfort (work table, monitor, etc.), the natural frequency of the seat is reduced, which leads in the driving mode to vibration of the seat, in particular the backrest, or even to annoying noises. The natural frequency of the vehicle seat often affects the excitation frequency of the vehicle, which leads to vibrations of the vehicle seat that can be perceived particularly intensely. In particular, a high mass in the upper backrest region behaves negatively in relation to a weight-optimized seat substructure with respect to the occurrence of perceivable vibrations of the vehicle seat. In addition, the equipment of the seat, in particular in the region of the backrest or the headrest, changes the natural frequency of the seat. These problems are countered by vibration absorbers which are provided in the vehicle seat, in particular in the backrest. Customarily, vibration absorbers of this type are configured for one frequency range, but this constitutes a compromise.

DE 20 2008 004 078 U1 discloses a vehicle seat having a vibration absorber arrangement which is provided in the backrest between the sleeves of the headrest receptacle and is provided with an absorber mass arranged in a housing.

DE 10 2005 019 323 B3 discloses and describes a vibration absorber for a vehicle seat, in which the absorber mass is arranged in a support frame which can be connected to the vehicle seat.

JP 2013-024392 A discloses and describes a vibration damper for a vehicle seat, in which an absorber mass is clamped in two directions in space between two rubber-metal elements. A change in the clamping, in which the free rubber portion of the respective rubber-metal elements is extended or shortened, can affect the damping frequency.

It is an object of the present invention to provide a vehicle seat having a vibration absorber, in which the damping frequency can be optimally adapted to the vehicle seat.

This object is achieved by the features of the independent claims.

A vehicle seat having a vibration absorber, wherein the vehicle seat has a seat base element, which is connected or can be connected to a vehicle structure, and a backrest, which can be inclined on the seat base element about a backrest inclination axis, and wherein the backrest has a vibration absorber which is coupled to a backrest structure of the backrest and is integrated in the backrest, is distinguished according to the invention in that the vibration absorber has at least one holding element which is connected to the backrest structure of the backrest and is elastic at least in regions and which has first coupler which can be coupled to second coupler provided on an absorber mass element, wherein the first coupler and the second coupler form a multi-stage coupling arrangement by means of which the distance between the backrest inclination axis and the absorber mass element can be varied.

The provision of the multi-stage coupling arrangement makes it possible to adapt the damping frequency of the damping arrangement to the vehicle seat by adjusting the distance between the backrest inclination axis and the absorber mass element in a manner selected individually for the vehicle seat. For example, it is thus possible even as the seat is being manufactured to position the absorber mass element, depending on the equipment of the vehicle seat and in particular on the backrest thereof, in such a manner that the vibration damping is optimally adapted to the vehicle seat with the special equipment (for example with an unfoldable backrest table and/or a monitor in the backrest or in the headrest).

Owing to different installation positions, the absorber mass element can therefore deploy different absorber effects which are adapted to the seat configuration. Thus, during the installation of the seat, by selecting the installation position of the absorber mass element depending on the equipment of the vehicle seat, optimum comfort can be ensured in a simple manner. Even during later retrofitting of the seat with an accessory, for example with a headrest having a monitor, and with an associated change in the mass and the mass distribution of the vehicle seat or of the backrest thereof, the damping properties of the vehicle seat can be adapted to the new seat equipment by simple repositioning of the absorber mass element by means of the multi-stage coupling arrangement.

By virtue of the open design of the vibration absorber without a housing and with an elastic holding element which is attached directly to the backrest structure and freely supports the absorber mass element, not only are manufacturing costs saved, but also access to the absorber mass element, for example for retrospective corrections of the vibration damping properties, is facilitated.

Further preferred and advantageous embodiment features of the vehicle seat according to the invention are the subject matter of the dependent claims.

It is particularly advantageous if the first coupler or the second coupler have at least one engagement element with a shaft portion and with at least one arm portion protruding laterally therefrom, and if the second coupler or the first coupler have at least one receiving groove for the respective engagement element, the receiving groove having a central groove channel for receiving the shaft portion, at least one first lateral groove channel extending to the side therefrom and at least one second lateral groove channel extending to the side therefrom, wherein the first lateral groove channel and the second lateral groove channel are spaced apart from each other in the depth direction of the central groove channel (z direction) such that the lateral groove channels are designed for alternatively receiving the at least one arm portion of the engagement element. This embodiment of the vibration absorber makes it possible in a simple manner to connect the absorber mass element in different positions to the holding element.

In particular, it is of advantage if the engagement element is T-shaped in cross section. This embodiment makes it possible in a simple manner to push the absorber mass element onto the holding element and thus to couple the two elements to each other.

In a preferred embodiment of the invention which can be combined with other embodiments, the absorber mass element, in its state coupled to the elastic holding element, with the exception of the coupler, is freely mounted spaced apart on all sides from the holding element and from the backrest structure. This permits a vibration movement of the absorber mass element on all sides without the latter coming into contact with the holding element and/or with the backrest structure.

It is also of advantage if the vibration absorber is arranged on the backrest structure between the guide sleeves of the headrest holder, the guide sleeves being provided in the backrest.

In addition, the invention is directed toward a vehicle, in particular a motor vehicle, having at least one such vehicle seat equipped according to the invention.

Preferred exemplary embodiments of the invention with additional refinement details and further advantages are described and explained in more detail below with reference to the attached drawings.

DETAILED DESCRIPTION OF THE DRAWINGS

Figure 1:
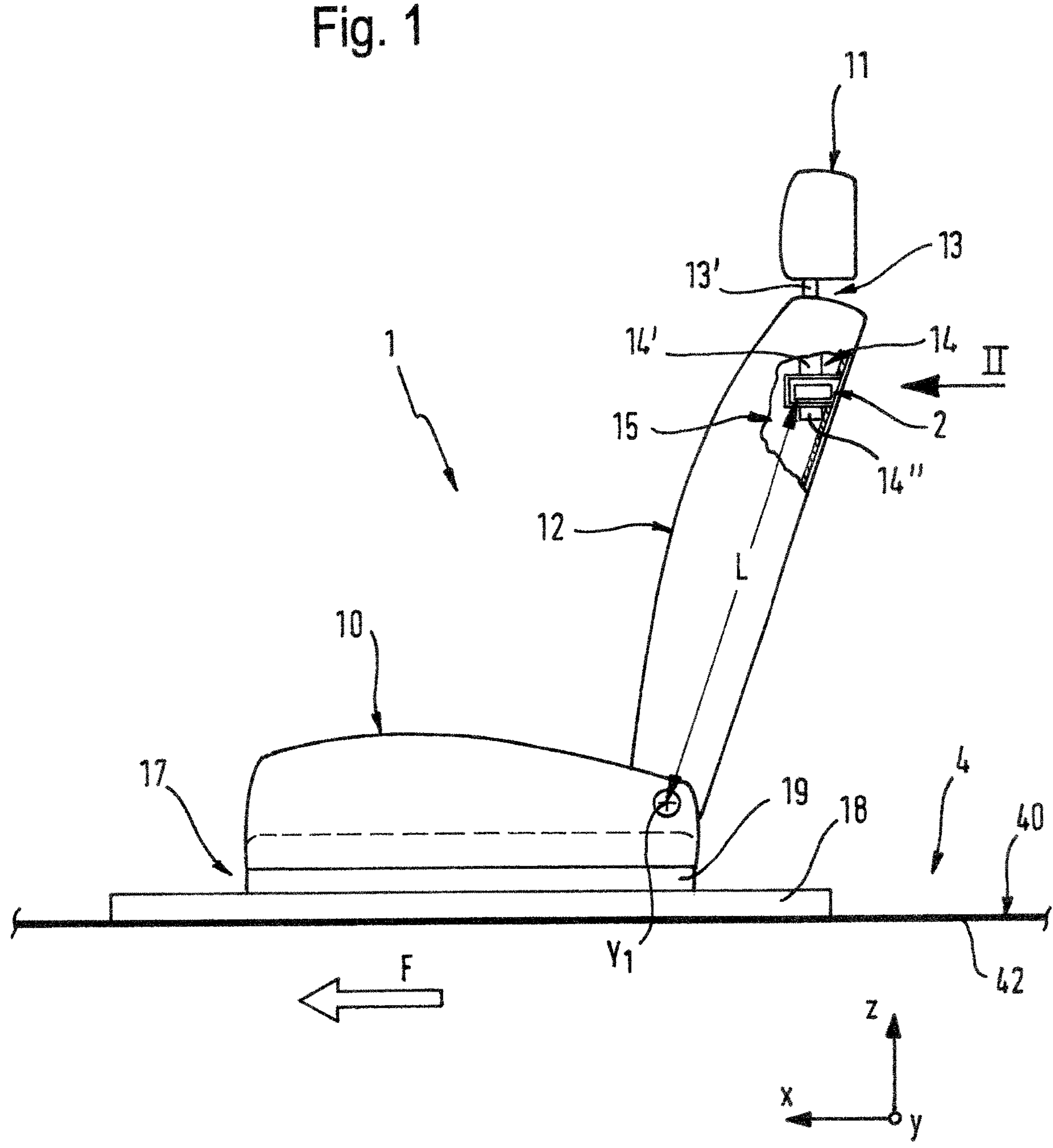
FIG. 1 is a partially sectioned side view of a vehicle seat according to an embodiment of the invention with a vibration absorber provided in the backrest.

FIG. 1 shows a vehicle seat 1 in a stylized, partially sectioned side view with a seat base element 10 and a backrest 12 which is provided on its top side with a headrest 11 and in which a vibration absorber 2 is provided. The backrest 12 can be inclined to the rear about a backrest inclination axis Y1 relative to the seat base element 10. The headrest 11 has a headrest holder 13 with a left and a right supporting rod 13', 13" which is, in each case, inserted into a left guide sleeve 14' or a right guide sleeve 14" of a headrest receptacle 14, which is provided in the backrest 12 and is connected to an inner backrest structure 15.

The seat base element 10 is connected by means of a seat longitudinal adjustment device 17 to a floor panel 42, which belongs to the vehicle structure 40 of a vehicle 4, in a manner known to a person skilled in the art, for example by screwing. The seat longitudinal adjustment device 17 has a left and right lower rail 18 connected to the floor panel 42. Each lower rail 18 is assigned an upper rail 19 which is mounted displaceably and lockably with respect to the respective lower rail 18.

The vibration absorber 2 is arranged in the upper part of the backrest 12 and will be described in more detail below with reference to FIG. 2 and FIG. 3.

Figures 2, 3:
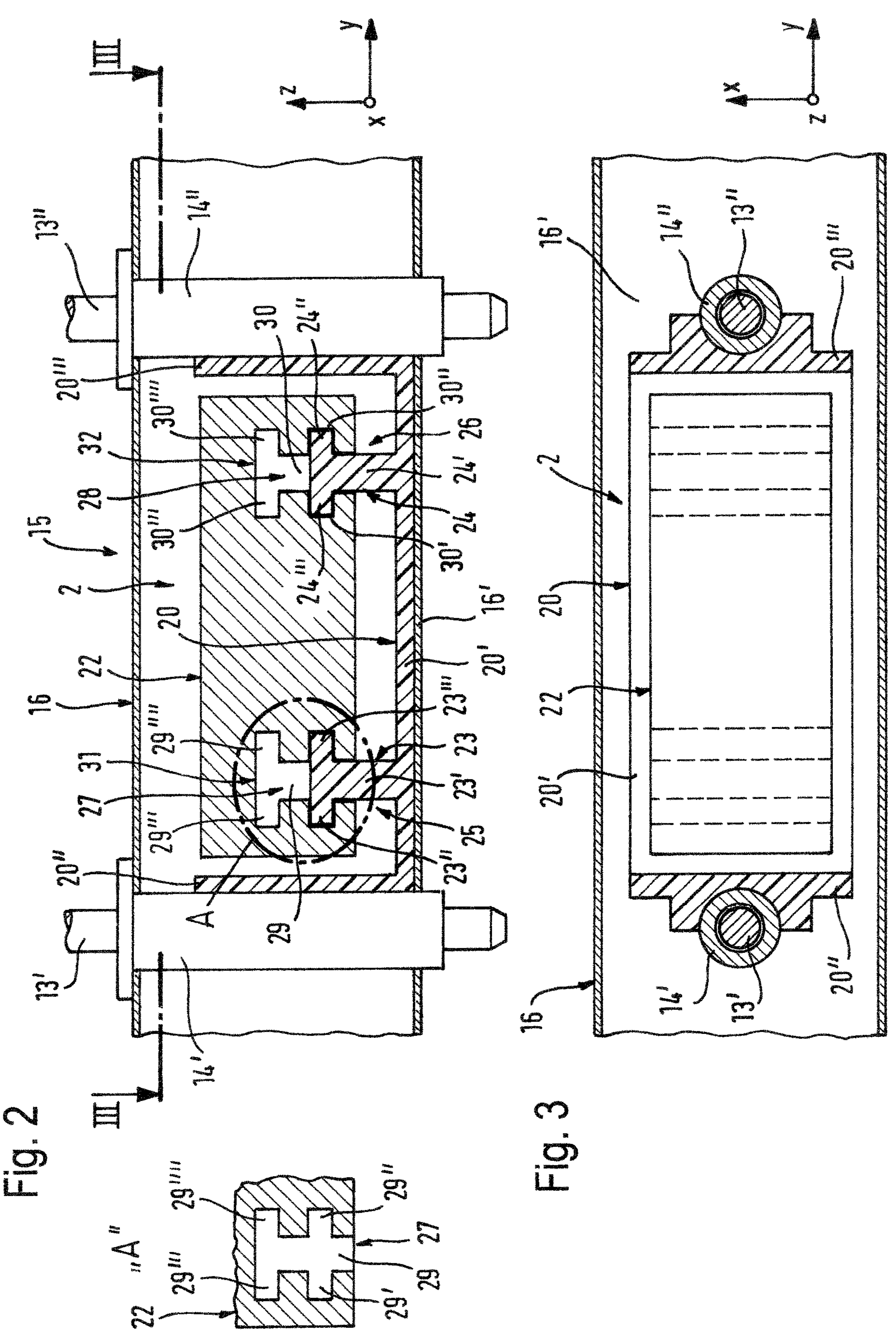
FIG. 2 is a rear view of the vibration absorber provided in the backrest in the direction of the arrow II in FIG. 1.
FIG. 3 is a sectioned top view of the vibration absorber provided in the backrest in the direction of the arrows III-III in FIG. 2.

A crossmember 16 of the backrest structure 15 of the vehicle seat 1 can be seen in FIG. 2. The crossmember 16 holds the guide sleeves 14', 14" which in each case receive a supporting rod 13' or 13" of the headrest holder 13.

An elastic holding element 20, which is provided for holding an absorber mass element 22 and, together therewith, forms the vibration absorber 2, is arranged between the two guide sleeves 14', 14". The elastic holding element 20 has a base 20' which extends between the two guide sleeves 14', 14" and rests on a lower horizontal limb 16' of the crossmember 16 and is connected, for example adhesively bonded, thereto. The lateral edges of the horizontal base 20' of the elastic holding element 20 are adjoined by vertical limbs 20", 20'" which are each connected to their associated guide sleeve 14' or 14", as can be seen in FIG. 3. Both the base 20' and the two limbs 20", 20'" are formed from an elastic material with damping properties, for example from rubber or from another elastomer.

As can be seen particularly clearly in FIG. 2, in each case a right and a left rail-shaped engagement element 23, 24, likewise formed from the elastic material with damping properties and in each case forming a first coupler 25, 26, extend from the base 20' of the elastic holding element 20 upward away from the horizontal limb 16'. The respective engagement element 23, 24 extends at a right angle to the plane of the drawing of FIG. 2 and therefore in the seat longitudinal direction x corresponding to the direction of travel F. The respective engagement element 23, 24 has a shaft portion 23' or 24' extending upward away from the base element 20'. At the upper end of the respective shaft portion 23', 24', a left and a right laterally protruding arm portion 23", 23'" or 24", 24'" are formed, and therefore the engagement element 23 and the engagement element 24 each have a T-shaped contour in cross section, as can be seen in FIG. 2.

The absorber mass element 22 is provided on its underside with a left receiving groove 27 and a right receiving groove 28 which likewise extend in the seat longitudinal direction x and which are spaced apart from each other in the transverse direction y in such a manner that they can interact with the engagement elements 23, 24. The detail A in FIG. 2 shows the design of the left receiving groove 27; the right receiving groove 28 is formed analogously. Therefore, only the left receiving groove is illustrated in detail in FIG. 2, this illustration applying in the same manner to the right receiving groove.

The receiving groove 27, 28 has a central groove channel 29, 30 which is designed for receiving the respective shaft portion 23', 24' of the respective engagement element 23, 24. From the respective central groove channel 29, 30 there extend lower lateral groove channels 29', 29" or 30', 30" to the respective side and upper lateral groove channels 29'", 29"" or 30'", 30"" spaced apart therefrom in the vertical direction z. These lateral groove channels 29', 29", 29'", 29"" or 30', 30", 30'", 30"" are in each case designed for receiving a laterally protruding arm portion 23", 23'" or 24", 24'" of the relevant engagement element 23 or 24. The respective receiving groove 27, 28 thus, in each case, forms a second coupler 31, 32 which interacts with the associated first coupler 25, 26 and forms a respective rail connection.

The absorber mass element 22 can thus be coupled in two different vertical positions (in the z direction) to the elastic holding element 20, namely by the absorber mass element 22 being pushed onto the engagement element in such a manner that the laterally protruding arm portions 23", 23'" or 24", 24'" thereof engage in the lower lateral groove channels 29', 29" or 30', 30" or in the upper lateral groove channels 29'", 29"" or 30'", 30"". As a result, the distance L between the backrest inclination axis Y1 and the absorber mass element 22 can be adjusted to be smaller or larger, and therefore different natural frequencies of the backrest 12 and therefore of the vehicle seat 1 arise.

The invention is not restricted to the above exemplary embodiment which serves merely for generally explaining the core concept of the invention. On the contrary, within the scope of protection, the device according to the invention can also assume other embodiments than the ones described above. The device here can in particular have features which constitute a combination of the respective individual features of the claims.

Reference signs in the claims, the description and the drawings serve merely for better understanding of the invention and are not intended to restrict the scope of protection.

LIST OF REFERENCE SIGNS

1 vehicle seat
2 vibration absorber

4 vehicle
10 seat base element
11 headrest
12 backrest
13 headrest holder
13' left supporting rod
13" right supporting rod
14 headrest receptacle
14' left guide sleeve
14" right guide sleeve
15 inner backrest structure
16 crossmember
16' lower horizontal limb
17 seat longitudinal adjustment device
18 lower rail
19 upper rail
20 elastic holding element
20 horizontal base
20" vertical limb
20'" vertical limb
22 absorber mass element
23 right rail-shaped engagement element
23' shaft portion
23" arm portion
23'" arm portion
24 left rail-shaped engagement element
24 shaft portion
24" arm portion
24'" arm portion
25 first coupler
26 first coupler
27 left receiving groove
28 right receiving groove
29 central groove channel
29' lower lateral groove channel
29" lower lateral groove channel
29'" upper lateral groove channel
29"" upper lateral groove channel
30 central groove channel
30' lower lateral groove channel
30" lower lateral groove channel
30'" upper lateral groove channel
30"" upper lateral groove channel
31 second coupler
32 second coupler
40 vehicle structure
42 floor panel
F direction of travel
L distance
x seat longitudinal direction
y transverse direction
Y1 backrest inclination axis
z vertical direction

What is claimed is:

1. A vehicle seat, comprising:
a seat base which is connectable to a vehicle structure;
a backrest which is inclinable on the seat base about a backrest inclination axis; and
a vibration absorber which is coupled to a backrest structure of the backrest and is integrated in the backrest, wherein
the vibration absorber has at least one holding element which is connected to the backrest structure of the backrest and is elastic at least in regions,
the holding element has a first coupler which is couplable to second coupler provided on an absorber mass element, and
the first coupler and the second coupler form a multi-stage coupling arrangement by which a distance between the backrest inclination axis and the absorber mass element is variable.

2. The vehicle seat according to claim 1, wherein
the first coupler or the second coupler compare at least one engagement element with a shaft portion and with at least one arm portion protruding laterally therefrom, and
the second coupler or the first coupler comprise at least one receiving groove for the respective engagement element, the receiving groove having a central groove channel for receiving the shaft portion, at least one first lateral groove channel extending to a side therefrom, and at least one second lateral groove channel extending to a side therefrom,
the first lateral groove channel and the second lateral groove channel are spaced apart from each other in a depth direction of the central groove channel such that the first and second lateral groove channels are configured for alternatively receiving the at least one arm portion of the engagement element.

3. The vehicle seat according to claim 2, wherein
the engagement element is T-shaped in cross section.

4. The vehicle seat according to claim 1, wherein
the absorber mass element, in a state coupled to the holding element, with the exception of the first and second couplers, is freely mounted spaced apart on all sides from the holding element and from the backrest structure.

5. A vehicle comprising at least one vehicle seat according to claim 1.

* * * * *